United States Patent [19]
Greener et al.

[11] Patent Number: 6,071,682
[45] Date of Patent: *Jun. 6, 2000

[54] CONTROL OF CORE-SET CURL OF PHOTOGRAPHIC FILM SUPPORTS BY COATED LAYERS

[75] Inventors: Jehuda Greener; Paul D. Yacobucci; Beverly A. Contestable; Catherine A. Falkner, all of Rochester, N.Y.

[73] Assignee: Eastman Kodak Company, Rochester, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/948,219

[22] Filed: Oct. 9, 1997

[51] Int. Cl.$^7$ .............................. G03C 1/795; G03C 1/81
[52] U.S. Cl. ...................... 430/533; 430/523; 430/531; 430/534; 430/536; 430/930; 430/935; 428/412; 428/423.7; 428/425.1; 428/480; 428/481; 428/483; 428/507
[58] Field of Search ..................... 430/531, 533, 430/535, 534, 536, 930, 523, 935; 428/412, 423.1, 423.7, 425.1, 480, 481, 483, 507, 515, 533, 534, 532

[56] References Cited

U.S. PATENT DOCUMENTS

| | | | |
|---|---|---|---|
| 3,006,761 | 10/1961 | Reichel et al. .............................. | 96/75 |
| 3,117,046 | 1/1964 | Klockgether et al. .................. | 430/531 |
| 3,370,950 | 2/1968 | Verelst et al. ........................... | 430/531 |
| 3,806,574 | 4/1974 | Arvidson ................................. | 264/160 |
| 3,916,022 | 10/1975 | Potter ..................................... | 264/285 |
| 4,141,735 | 2/1979 | Schrader et al. ........................ | 428/480 |
| 4,198,458 | 4/1980 | Mitsuishi et al. . | |
| 4,808,363 | 2/1989 | Walsh et al. ............................. | 264/284 |
| 4,851,174 | 7/1989 | Lorach .................................... | 264/234 |
| 4,892,689 | 1/1990 | Van Cappellen et al. ................ | 264/25 |
| 4,994,214 | 2/1991 | Stevens et al. ........................... | 264/25 |
| 5,254,445 | 10/1993 | Takamuki et al. ...................... | 430/501 |
| 5,288,601 | 2/1994 | Greener et al. ......................... | 430/533 |
| 5,425,980 | 6/1995 | Grace et al. ............................. | 430/532 |
| 5,549,864 | 8/1996 | Greene et al. ........................... | 264/280 |
| 5,585,229 | 12/1996 | Kawamoto et al. ..................... | 430/533 |
| 5,629,141 | 5/1997 | Kawamoto .............................. | 430/501 |
| 5,631,124 | 5/1997 | Ikuhara et al. .......................... | 430/533 |
| 5,723,208 | 3/1998 | Suzuki et al. ........................... | 430/533 |
| 5,759,756 | 6/1998 | Laney et al. ............................. | 430/533 |

FOREIGN PATENT DOCUMENTS

| | | |
|---|---|---|
| 81926 | 6/1983 | European Pat. Off. . |
| 0 568 268 A2 | 11/1993 | European Pat. Off. . |
| 0 572 275 A1 | 12/1993 | European Pat. Off. . |
| 2279905 | 1/1995 | United Kingdom . |
| 93/25607 | 12/1993 | WIPO . |

OTHER PUBLICATIONS

Research Disclosure 37038, Feb. 1995, pp. 79–116.
Research Disclosure 38957, Sep. 1996, pp. 591–639.

*Primary Examiner*—Richard L. Schilling
*Attorney, Agent, or Firm*—Carl F. Ruoff

[57] ABSTRACT

The present invention is photographic film base which includes a polymeric support having a first side and a second side and a glass transition temperature ($Tg_s$). A polymeric layer is superposed on the first side of the polymeric support, the polymer layer having a glass transition temperature $Tg_L$ which is greater than the glass transition temperature of the support $Tg_s$. The polymeric layer has a thickness of at least 2.5 percent of the thickness of the support.

7 Claims, No Drawings

CONTROL OF CORE-SET CURL OF PHOTOGRAPHIC FILM SUPPORTS BY COATED LAYERS

FIELD OF THE INVENTION

This invention relates to a photographic film base wherein the core-set curl propensity of the base is minimized and to photographic elements containing this film base.

BACKGROUND OF THE INVENTION

In many imaging applications excessive film curl can cause serious difficulties with film transport and handling and it is, therefore, important to reduce the core-set propensity of the image-bearing film to meet system specifications. Over the years many approaches have been taken to reduce curl in photographic films, particularly that associated with core-set. These can be generally grouped in terms of four distinct mechanisms: (1) Physical aging, (2) Inherent curl, (3) Ironing, and (4) Reverse winding. Each of these mechanisms is applicable for certain types of films and selection of one over the other depends on the particular circumstances of the problem at hand. Following is a brief summary of these general approaches:

Physical Aging

This method is practiced by heating the finished film (usually but not only) in a wound state to relatively high temperatures (typically 10 to 40° C. below the glass transition) for relatively long times (typically >1 day) in order to lower the propensity of the film to take up curl in subsequent winding steps. This high temperature annealing treatment changes the relaxation characteristics of the constituent material (an aged film relaxes slower than a fresh film) and is especially useful when the final winding diameter of the film is much smaller than the diameter during annealing. U.S. Pat. Nos. 5,254,445, 5,629,141 5,585,229 and 4,141,735 are examples based on this general principle, and are incorporated by reference herein.

Inherent Curl

During the manufacture of film support it is possible to induce curl in a given direction by differentially (asymmetrically) heating the support during the stretching operation (preferably during the drafting step), i.e., by inducing a temperature gradient of about 10–15° C. across the thickness of the film as it is being stretched above the glass transition temperature (Tg). If this inherent curl is in a direction opposite to the expected core-set curl, it will offset, to some extent, the curl induced during winding and will yield lower final curl. This method requires significant modifications of the film manufacturing process and fine-tuning of the stretching temperature during the drafting and/or tentering steps. U.S. Pat. Nos. 4,892,689 and 4,994,214 are examples of this approach and are herein incorporated by reference. The latter combines the inherent curl approach with physical aging, i.e., after an inherent curl is induced in the film it is annealed under typical aging conditions.

Ironing

By heating relatively short and narrow film sections to high temperatures, in the vicinity of Tg, it is possible to remove curl induced by core-set. This method requires some tension as the film is transported through the ironing device and the film must be either flat or slightly curved in a direction opposite of the expected core-set curl. Residence times for this heating method are relatively short, of the order of minutes or less. However, this method is not ideally suited for treating wide and long production rolls because of difficulty of controlling temperature uniformity and the possibility of distorting and scratching the film and damaging the coated emulsion layers within the ironing device. This general approach is taken in U.S. Pat. Nos. 3,916,022, 4,808,363, 4,851,174 and 5,549,864 herein incorporated by reference.

Reverse Winding

By winding the film in the opposite direction of its induced core-set curl, the curl level can be reduced. This approach can be practiced at any temperature but the rate of curl change depends on the temperatures at which the film is stored and rewound and it may require very long time to achieve a meaningful reduction in curl at ambient conditions. U.S. Pat. No. 3,806,574 falls under this general category although it does not provide any clear guidelines as to the conditions of the rewinding step necessary to achieve partial or complete erasure of curl.

In the present invention the core-set curl propensity of the film is modified by laminating the film support with an appropriate polymeric layer and placing it on the convex ('out') side with respect to the expected winding direction. The laminated layer can be applied by co-extrusion, co-casting or by coating using conventional methods and its thickness must exceed some critical limit. This approach eliminates the need to do on-line or off-line decurling as noted above and it may also eliminate the need to anneal ('age') the support or at least reduce the severity of the annealing treatment (e.g., lower annealing temperatures, shorter annealing times).

SUMMARY OF THE INVENTION

The present invention is photographic film base which includes a polymeric support having a first side and a second side and a glass transition temperature ($Tg_s$). A polymeric layer is superposed on the first side of the polymeric support, the polymer layer having a glass transition temperature $Tg_L$ which is greater than the glass transition temperature of the support $Tg_s$. The polymeric layer has a thickness of at least 2.5 percent of the thickness of the support.

The invention also includes a photographic element employing the photographic support described above.

DETAILED DESCRIPTION OF THE INVENTION

We have found that laminating a photographic film base with a polymeric layer of sufficient thickness reduces the core-set curl propensity of the film if the glass transition temperature of the coated layer is sufficiently higher than that of the film base material. In one aspect, the present invention is a photographic film base comprising a thick layer of a conventional base material, e.g., poly(ethylene terephthalate) (PET), poly(ethylene naphthalate) (PEN) or cellulose acetate (CA), and a thinner layer of a high glass transition (Tg) polymer applied on the convex ('out') side with respect to the expected winding direction. In another aspect, the present invention is a silver halide photographic element comprising a film base bearing at least one photographic layer, the film base comprising at least two layers, one being a conventional film base (Polymer A) and the other being a high-Tg polymeric layer (Polymer B) having a thickness of at least 2.5% of the total support thickness. It is preferred that the thickness be at least 3% of the total thickness. It is most preferred that the thickness be at least 5% of the total thickness. It is desirable in the present invention that the glass transition temperature of Polymer B be, at least, 20° C. higher than that of Polymer A.

In the present invention conventional photographic film supports, e.g., poly(ethylene terephthalate) (PET), poly(ethylene naphthalate) (PEN) and cellulose acetate (CA) are the starting materials (Layer A). These films and the methods of their preparation are well known in the art. The films are modified by applying a polymeric layer (Layer B) on one side of the film. In the case of PET and PEN, Layer B can be applied by direct coating from solution or by the co-extrusion method. Both methods are well known in the art. If a coating method is selected the surface of Layer A must be properly primed to promote adhesion between the layers. The polymer (Polymer B) is dissolved in an appropriate solvent and deposited on the primed surface of Layer A to form Layer B. The laminated film is then dried to remove excess solvent from the coated layer. If a co-extrusion method is selected the two layers are formed together during the extrusion step of the manufacturing process for making polyester film. This process requires a specially configured co-extrusion die to distribute the two materials (Layers A and B) to form the two-layered laminate. Another essential requirement of the co-extrusion method is that the Tg's of both materials be less than approximately 30° C. apart so that both materials can be co-stretched biaxially under similar conditions. This condition severely curtails the utility of the co-extrusion method for use in this invention since we require that the Tg of Polymer B be at least 20° C. higher than the Tg of Polymer A to manifest the benefits of the coated layer. For this reason, co-extruded photographic film supports disclosed in U.S. Pat. Nos. 5,288,601 and European Patent Application Nos. 568,268 and 572,275 will not exhibit the desired reduction in core-set curl propensity. The Tg difference in the films is less than 20° C. In the case of a CA base, Polymer B must be either cocast during base manufacturing or coated from a solvent that does not dissolve the CA layer. The latter requirement severely limits the coating option in this case.

The polymer in Layer B to be deposited on Layer A must meet the following criteria. It's Tg must be at least 20° C. higher than that of Polymer A and it must be soluble in a solvent that does not attack Layer A (if it is to be applied by coating). It is preferable that the Tg of Layer B be at least 30° C. higher than the Tg of Layer A. In addition, it's molecular weight (number average) must be greater than 10,000 to maintain good mechanical integrity. Examples of polymers that can be used in this invention are: aromatic polyesters, polyurethanes polycarbonates, polyamides, polyolefins and cellulosics.

Finally, in order to fully manifest the benefits of this invention the thickness of Layer B must be $\geq 2.5\%$ of the total film thickness and it must be positioned on the convex side of the film (side facing outward when the film is wound).

When all the above conditions are met the core-set curl propensity of the laminated film ($CS_L$) is lower compared to that of the uncoated support (Layer A) ($CS_A$). If the core-set propensity of the laminated film is still higher than desired, the film can be annealed under standard conditions as prescribed in U.S. Pat. No. 4,141,735 and still retain the advantage in core-set curl propensity relative to the uncoated film.

The support of the present invention may be treated with corona discharge (CDT), UV, glow discharge (GDT), flame or other such methods that enhance adhesion of the support surface. The preferred method is the glow discharge treatment as described in U.S. Pat. 5,425,980 incorporated herein by reference.

Film base of the present invention can contain other components commonly found in film supports for photographic elements. These components can be included in the polymeric support or the polymeric layer. These include dyes, lubricants and particles of organic and inorganic materials such as glass beads, filler particles, magnetic particles and antistatic agents. These are described in more detail in *Research Disclosure*, February 1995, Item 37038, pages 79–114 and *Research Disclosure*, September 1996, Item 38957, pages 591–639 incorporated herein by reference.

Film base prepared according to the present invention can bear layers commonly found on film support used for photographic elements. These include magnetic recording layers, subbing layers between other layers and the support, photosensitive layers, interlayers and overcoat layers, as are commonly found in photographic elements. These layers can be applied by techniques known in the art and described in the references cited in *Research Disclosure*, Item 37038 cited above.

Magnetic recording layers that can be used in photographic elements of this invention are described in U.S. Pat. Nos. 3,782,947; 4,279,975; 5,147,768; 5,252,441, 52:54, 449; 5,395,743; 5,397,826; 5,413,902; 5,427,900; 5,432, 050; 5,434,037; 5,436,120; in *Research Disclosure*, November 1992, Item 34390, pages 869 et seq., and in Hatsumei Kyonkai Gihou No. 94-6023, published Mar. 15, 1995, by Hatsumei Kyoukai, Japan.

Photographic elements of this invention can have the structure and components shown in *Research Disclosures*, Items 37038 and 38957 cited above and can be imagewise exposed and processed using known techniques and compositions, including those described in the *Research Disclosures* Items 37038 and 38957 cited above.

The following examples further illustrate the invention.

EXAMPLE 1

A 105 µm thick. PET film base (Tg=76° C.) was prepared in a manner well known to those skilled in the art. The base was primed with an adhesion promoting layer and then coated with a solution of Poly [4,4'(hexafluoro isopropylidene) diphenolene terephthalate-co isophthalate] 50/50 (Tg=220° C., molec. wt.=187,000) in a solvent mixture of methylene chloride:2-butanone (80:20 wt.) to achieve different coverages. The coated films were dried at 100° C. for 5 min. in a convection oven and then tested for core-set.

Glass Transition Temperature: Samples of each composition were heated in a differential scanning calorimeter (a 990 Thermal Analyzer sold by Dupont, Wilmington, Del.) from about 20 C. to 300 C. at 10 C/min. The Tg reported is the mid-point temperature in the first transition of the second thermogram.

The core-set test was performed using the following procedure: six lengthwise strips 152 mm×25 mm were cut from each of the test films. The strips were conditioned at 21° C./50% RH for 24 hrs, then wound, with the coated layer facing out, on 25 mm dia. metal cylinders and placed in an oven. Three incubation conditions were used: I. 80° C. for 2 hr, II. 50° C. for 24 hr and III. 21° C. for 7 days. After the respective rolls were removed from the oven the films were allowed to equilibrate, for 10 min at ambient and the ensuing curl was measured according to Test Method A in ANSI P41.29-1985. The results are summarized in TABLE 1 and are reported as averages in ANSI curl. $CS_I$, $CS_{II}$ and $CS_{III}$, represent the corresponding curl values for incubation conditions I, II and III, respectively. A coverage of 100 mg/ft$^2$ corresponds to approximately 1 µm of dry layer laydown.

TABLE 1

EXAMPLE 1

| Coverage (mg/ft$^2$) | CS$_I$ (ANSI) | CS$_{II}$ (ANSI) | CS$_{III}$ (ANSI) |
|---|---|---|---|
| 0 | 128.0 | 84.0 | 69.4 |
| 25 | 126.6 | 86.0 | |
| 50 | 131.6 | 88.0 | |
| 100 | 124.6 | 80.0 | |
| 140 | 124.0 | 80.6 | 65.0 |
| 300 | 117.6 | 77.4 | 61.4 |
| 500 | 108.4 | 63.0 | 35.2 |

EXAMPLE 2

Same as Example 1 except that the polymer is coated on a 87 μm thick. PEN film (Tg=120° C.). The PEN film was prepared in a manner well known to those skilled in the art and was properly primed to promote adhesion with the coated layer. Results for this Example are summarized in TABLE 2.

TABLE 2

EXAMPLE 2

| Coverage (mg/ft$^2$) | CS$_I$ (ANSI) | CS$_{III}$ (ANSI) |
|---|---|---|
| 0 | 86.6 | 67.4 |
| 25 | 89.6 | |
| 50 | 84.0 | |
| 100 | 79.0 | |
| 140 | 84.0 | 59.4 |
| 300 | 80.4 | 59.4 |
| 500 | 73.0 | 41.4 |

EXAMPLE 3

Same as Example 2 except that the films made in this set were annealed in a convection oven at 100° C. for 24 hr before the core-set measurement. Results for this Example are summarized in TABLE 3.

TABLE 3

EXAMPLE 3

| Coverage (mg/ft$^2$) | CS$_I$ (ANSI) |
|---|---|
| 0 | 51.6 |
| 25 | 48.6 |
| 50 | 51.0 |
| 100 | 54.4 |
| 140 | 47.4 |
| 300 | 38.0 |
| 500 | 31.4 |

EXAMPLE 4

Same as Example 1 except that the coated polymer is {[2,2-bi(3,5-dibromo-4-hydroxyphenyl)propane] polycarbonate}(Tg=261° C., molec. weight=225,000). This polymer was coated from a solution of methylene chloride. Results for this Example are summarized in TABLE 4.

TABLE 4

EXAMPLE 4

| Coverage (mg/ft$^2$) | CS$_I$ (ANSI) |
|---|---|
| 0 | 128.0 |
| 25 | 126.0 |
| 50 | 128.6 |
| 100 | 124.0 |
| 150 | 126.0 |
| 300 | 113.4 |
| 500 | 110.0 |

EXAMPLE 5

Same as Example 2 except that the coated polymer is as in Example 4. Results for this set are summarized in TABLE 5.

TABLE 5

EXAMPLE 5

| Coverage (mg/ft$^2$) | CS$_I$ (ANSI) |
|---|---|
| 0 | 86.6 |
| 25 | 81.4 |
| 50 | 86.0 |
| 100 | 81.0 |
| 140 | 84.4 |
| 300 | 80.4 |
| 500 | 68.4 |

EXAMPLE 6

Same as Example 1 except that coated polymer is (p,p'-isopropylidene bisphenol polycarbonate)(Tg=140° C., molec. weight=43,400). The polymer was coated from a solution of methylene chloride. Results for this example are summarized in TABLE 6.

TABLE 6

EXAMPLE 6

| Coverage (mg/ft$^2$) | CS$_I$ (ANSI) |
|---|---|
| 0 | 128.0 |
| 25 | 121.0 |
| 50 | 115.0 |
| 100 | 127.0 |
| 140 | 127.0 |
| 300 | 114.6 |
| 500 | 110.6 |

EXAMPLE 7

Same as Example 2 except that the coated layer is the same as in Example 6. Results for this example are summarized in TABLE 7.

TABLE 7

EXAMPLE 7

| Coverage (mg/ft$^2$) | CS$_I$ (ANSI) |
|---|---|
| 0 | 86.6 |
| 25 | 82.0 |
| 50 | 85.0 |

TABLE 7-continued

EXAMPLE 7

| Coverage (mg/ft²) | CS$_I$ (ANSI) |
|---|---|
| 100 | 85.2 |
| 140 | 88.0 |
| 300 | 88.0 |
| 500 | 80.4 |

EXAMPLE 8

Same as Example 3 except that coated layer is the same as in Example 6. Results for this Example are summarized in TABLE 8.

TABLE 8

EXAMPLE 8

| Coverage (mg/ft²) | CS$_I$ (ANSI) |
|---|---|
| 0 | 47.0 |
| 25 | 49.0 |
| 50 | 48.6 |
| 100 | 48.4 |
| 140 | 51.4 |
| 300 | 47.0 |
| 500 | 32.0 |

EXAMPLE 9

Same as Example 1 except that the coated polymer (p,p'-isopropylidene bisphenol-co-diethylene glycol 70/30 polycarbonate) (Tg=92° C., molec. weight=91,400). This polymer was coated from a solution of methylene chloride. Results for this Example are summarized in TABLE 9.

TABLE 9

EXAMPLE 9

| Coverage (mg/ft²) | CS$_I$ (ANSI) |
|---|---|
| 0 | 128.0 |
| 25 | 128.4 |
| 50 | 124.6 |
| 100 | 128.4 |
| 140 | 123.4 |
| 300 | 119.6 |
| 500 | 123.0 |

EXAMPLE 10

Same as Example 2 except that the coated polymer is the same as Example 9. Results for this Example are summarized in TABLE 10.

TABLE 10

EXAMPLE 10

| Coverage (mg/ft²) | CS$_I$ (ANSI) |
|---|---|
| 0 | 86.6 |
| 25 | 97.4 |
| 50 | 98.0 |
| 100 | 86.4 |

TABLE 10-continued

EXAMPLE 10

| Coverage (mg/ft²) | CS$_I$ (ANSI) |
|---|---|
| 140 | 89.0 |
| 300 | 81.0 |
| 500 | 80.6 |

Photographic elements are prepared by coating the following layers in order on the support of the present invention.

Layer 1) A gelatin/poly(n-butyl acrylate-co-2-aminoethyl methacrylate hydrochloride-co-2-hydroxyethyl methacrylate (50/5/45), (hereinafter referred to as polymer P-1), subbing layer with 2 wt % chrome alum and 0.1% (by wt of total solution mass) Saponin as surfactant are coated from water. The coating solutions are applied using a coating hopper and dried for a time sufficient to remove water.

The following layers in the given sequence are applied to the supports as described above. The quantities of silver halide are given in grams of silver per m². The quantities of other materials are given in g per m².

Layer 2 {Antihalation Layer} black colloidal silver sol containing 0.236 g of silver, with 2.44 g gelatin.

Layer 3 {First (least) Red-Sensitive Layer} Red sensitized silver iodobromide emulsion [1.3 mol % iodide, average grain diameter 0.55 microns, average thickness 0.08 microns] at 0.49 g, red sensitized silver iodobromide emulsion [4 mol % iodide, average grain diameter 1.0 microns, average thickness 0.09 microns] at 0.48 g, cyan dye-forming image coupler C-1 at 0.56 g, cyan dye-forming masking coupler CM-1 at 0.033 g, BAR compound B-1 at 0.039 g, with gelatin at 1.83 g.

Layer 4 {Second (more) Red-Sensitive Layer } Red sensitive silver iodobromide emulsion [4 mol % iodide, average grain diameter 1.3 microns, average grain thickness 0.12 microns] at 0.72 g, cyan dye-forming image coupler C-1 at 0.23 g, cyan dye-forming masking coupler CM-1 at 0.022 g, DIR compound D-1 at 0.011 g, with gelatin at 1.66 g.

Layer 5 {Third (most) Red-Sensitive Layer} Red sensitized silver iodobromide emulsion [4 mol % iodide, average grain diameter 2.6 microns, average grain thickness 0.13 microns] at 1.11 g, cyan dye-forming image coupler C-1 at 0.13 g, cyan dye-forming masking coupler CM-1 at 0.033 g, DIR compound D-1 at 0.024 g, DIR compound D-2 at 0.050 g, with gelatin at 1.36 g.

Layer 6 {Interlayer} Yellow dye material YD-1 at 0.11 g and 1.33 g of gelatin

Layer 7 {First (least) Green-Sensitive Layer} Green sensitized silver iodobromide emulsion [1.3 mol % iodide, average grain diameter 0.55 microns, average grain thickness 0.08 microns] at 0.62 g, green sensitized silver iodobromide emulsion [4 mol % iodide, average grain diameter 1.0 microns, average grain thickness 0.09 microns] at 0.32 g, magenta dye-forming image coupler M-1 at 0.24 g, magenta dye-forming masking coupler MM-1 at 0.067 g with gelatin at 1.78 g.

Layer 8 {Second (more) Green-Sensitive Layer} Green sensitized silver iodobromide emulsion [4 mol % iodide, average grain diameter 1.25 microns, average grain thickness 0.12 microns] at 1.00 g, magenta dye-forming image coupler M-1 at 0.091 g, magenta dye-forming masking coupler MM-1 at 0.067 g, DIR compound D-1 at 0.024 g with gelatin at 1.48 g.

Layer 9 {Third (most) Green-Sensitive Layer} Green sensitized silver iodobromide emulsion [4 mol % iodide, average grain diameter 2.16 microns, average grain thickness 0.12 microns] at 1.00 g, magenta dye-forming image coupler M-1 at 0.0.72 g, magenta dye-forming masking coupler MM-1 at 0.056 g, DIR compound D-3 at 0.01 g, DIR compound D-4 at 0.011 g, with gelatin at 1.33 g.

Layer 10 {Interlayer} Yellow dye material YD-2 at 0.11 g with 1.33 g gelatin.

Layer 11 {First (less) Blue-Sensitive Layer} Blue sensitized silver iodobromide emulsion [1.3 mol % iodide, average grain diameter 0.55, average grain thickness 0.08 microns] at 0.24 g, blue sensitized silver iodobromide emulsion [6 mol % iodide, average grain diameter 1.0 microns, average grain thickness 0.26 microns] at 0.61 g, yellow dye-forming image coupler Y-1 at 0.29 g, yellow dye forming image coupler Y-2 at 0.72 g, cyan dye-forming image coupler C-1 at 0.017 g, DIR compound D-5 at 0.067 g, BAR compound B-1 at 0.003 g with gelatin at 2.6 g.

Layer 12 {(Second (more) Blue-Sensitive Layer} Blue sensitized silver iodobromide emulsion [4 mol % iodide, average grain diameter 3.0 microns, average grain thickness 0.14 microns] at 0.23 g, blue sensitized silver iodobromide emulsion [9 mol % iodide, average grain diameter 1.0 microns] at 0.59 g, yellow dye-forming image coupler Y-1 at 0.090 g, yellow dye-forming image coupler Y-2 at 0.23 g, cyan dye-forming image coupler C-1 0.022 g, DIR compound D-5 at 0.05 g, BAR compound B-1 at 0.006 g with gelatin at 1.97 g.

Layer 13 {Protective Layer} 0.111 g of dye UV-1, 0.111 g of dye UV-2, unsensitized silver bromide Lippman emulsion at 0.222 g, 2.03 g.

This film is hardened at coating with 2% by weight to total gelatin of hardener H-1. Surfactants, coating aids, scavengers, soluble absorber dyes and stabilizers are added to the various layers of this sample as is commonly practiced in the art.

The structural formulae for the components identified above by letter abbreviation are as follows:

C-1:

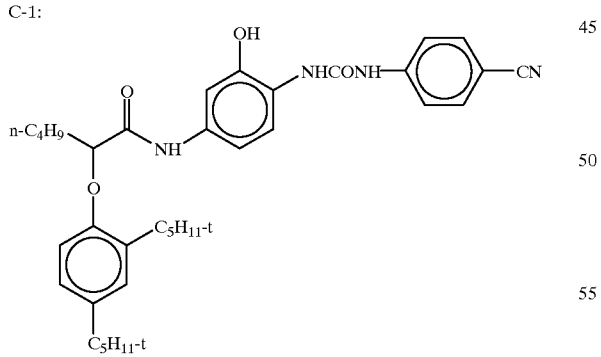

CM-1

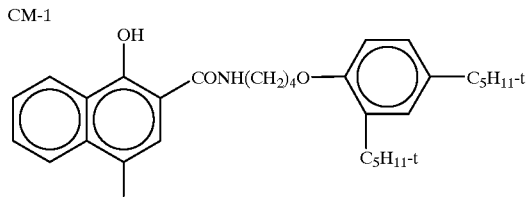

B-1

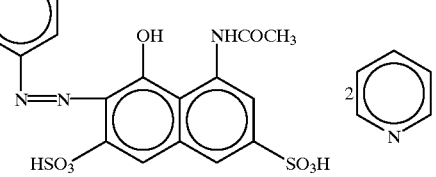

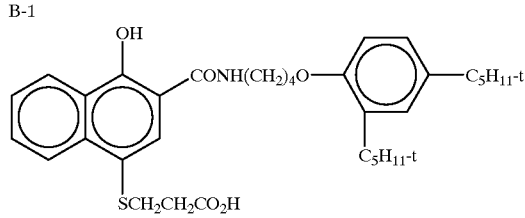

D-1:

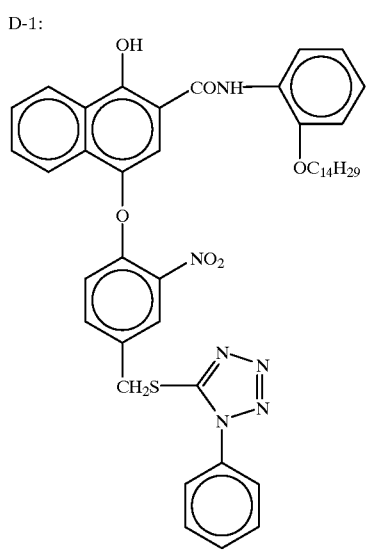

D-2
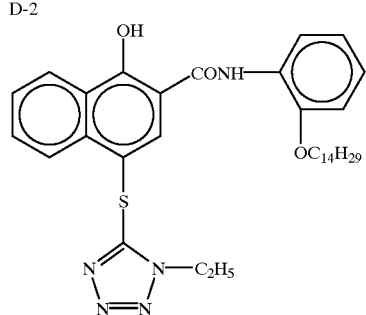
D-3:
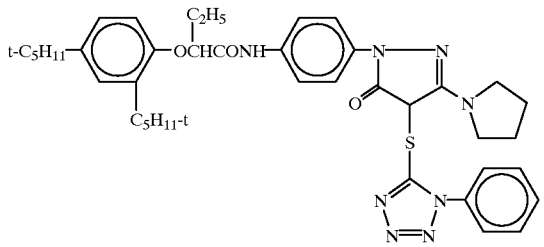
D-4
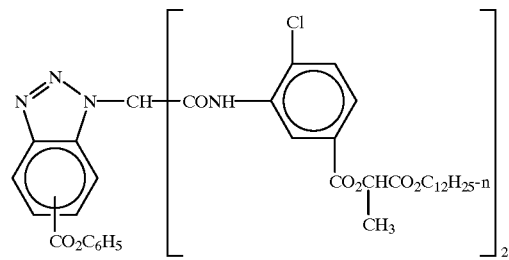
D-5:
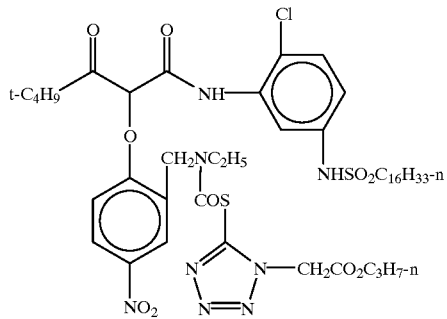
MM-1
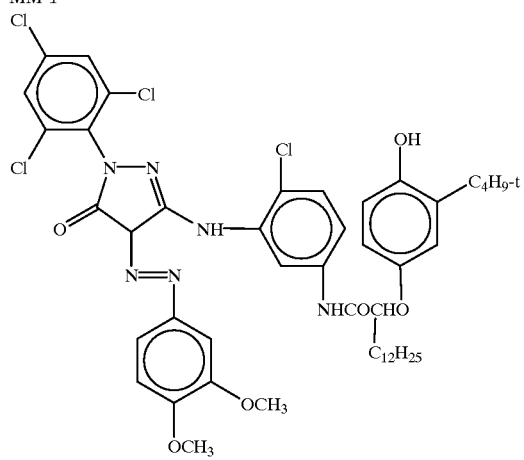
Y-1:
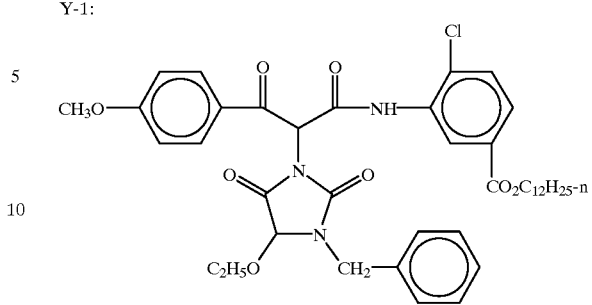
Y-2:
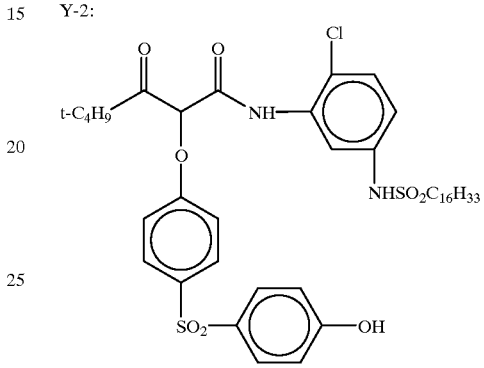
M-1:
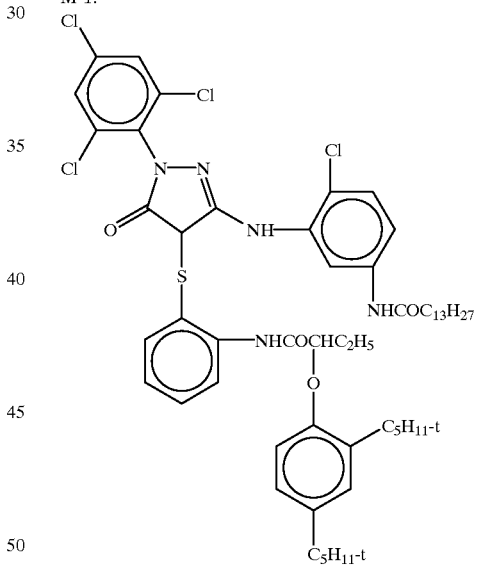
YD-1:
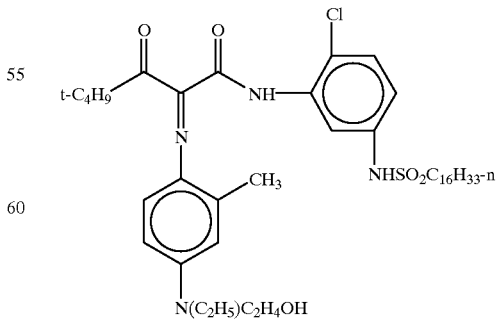

-continued

YD-2:
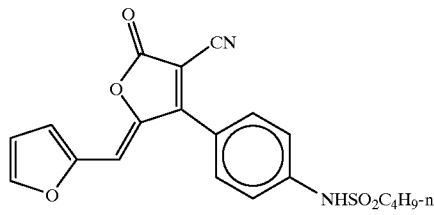

UV-1:
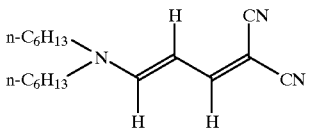

UV-2:
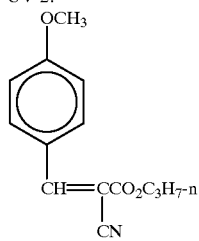

H-1:

The surface of the support opposite that bearing the subbing layer can contain magnetic recording layers, antistatic layers, subbing layers, lubrication layers, and the like, as described in U.S. Pat. No. 5,514,528, the disclosure of which is incorporated herein by reference.

The invention has been described in detail with particular reference to certain preferred embodiments thereof, but it will be understood that variations and modifications can be effected within the spirit and scope of the invention.

What is claimed is:

1. A method of making a photographic element comprising:
    providing a photographic support, said photographic support having a first side and a second side and a glass transition temperature ($Tg_s$)
    applying a coating on the first side of the photographic support said coating comprising a polymer having a glass transition temperature ($Tg_L$) at least 20° C. greater than the $Tg_s$ and a solvent
    drying the coating to form a polymeric layer having a thickness of at least 2.5 percent of a thickness of said support
    applying a silver halide light sensitive layer on said second side of said support.

2. The method of claim 1, wherein the glass transition temperature of the polymer $Tg_L$ is at least 30° C. higher than the glass transition temperature of the polymeric support $Tg_s$.

3. The method of claim 1, wherein said polymeric layer has a thickness of at least 3 percent of the thickness of said support.

4. The method of claim 1, wherein said polymeric layer has a thickness of at least 5 percent of the thickness of said support.

5. The method of claim 1, wherein the polymeric layer has a number average molecular weight of at least 10,000.

6. The method of claim 1, wherein the polymeric layer comprises aromatic polyesters, polycarbonates, polyamides, polyurethanes polyolefins and cellulosics.

7. The method of claim 1, wherein the polymeric support comprises poly(ethylene terephthlate), poly(ethylene naphthalate) or cellulose acetate.

* * * * *